United States Patent
Bisti et al.

(10) Patent No.: US 10,222,452 B2
(45) Date of Patent: Mar. 5, 2019

(54) METHOD FOR PRIORITIZING AND TRANSMITTING DATA GENERATED FROM AN AIRPLANE DURING FLIGHT

(71) Applicant: International Business Machines Corporation, Armonk, NY (US)

(72) Inventors: Jeffrey E. Bisti, New Paltz, NY (US); Raymond J. Cadmus, Jr., New Fairfield, CT (US); Frank J. De Gilio, Poughkeepsie, NY (US); Joseph Foti, Jr., New Windsor, NY (US); Jovanna Marquez, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 15/373,702

(22) Filed: Dec. 9, 2016

(65) Prior Publication Data

US 2018/0165969 A1    Jun. 14, 2018

(51) Int. Cl.
| | |
|---|---|
| *G08G 5/00* | (2006.01) |
| *G01S 7/00* | (2006.01) |
| *G01S 13/95* | (2006.01) |
| *H04B 7/185* | (2006.01) |

(52) U.S. Cl.
CPC ............ *G01S 7/003* (2013.01); *G01S 13/953* (2013.01); *G08G 5/00* (2013.01); *G08G 5/0013* (2013.01); *G08G 5/0021* (2013.01); *G08G 5/0056* (2013.01); *G08G 5/0091* (2013.01); *H04B 7/185* (2013.01)

(58) Field of Classification Search
CPC .................................................. G08G 5/0004
See application file for complete search history.

(56) References Cited

U.S. PATENT DOCUMENTS

| | | | |
|---|---|---|---|
| 7,039,509 B2 | 5/2006 | Podowski | |
| 7,113,852 B2 | 9/2006 | Kapadia et al. | |
| 8,959,065 B2 | 2/2015 | Gorinevsky | |
| 9,014,878 B2 | 4/2015 | Gu et al. | |
| 9,221,551 B2 | 12/2015 | Leroy et al. | |
| 9,327,841 B1 | 5/2016 | Sipper et al. | |
| 9,443,434 B2 * | 9/2016 | Hale | G08G 5/003 |

(Continued)

OTHER PUBLICATIONS

Bhattacharya, et al., "An Efficient Algorithm for Root Cause Analysis", http://www.tenet.res.in/Publications/Research/RCAPaper-NCC-2005.pdf, Feb. 2005, Accessed on Dec. 7, 2016, 5 pages.

*Primary Examiner* — Adam D Tissot
*Assistant Examiner* — Michael A Berns
(74) *Attorney, Agent, or Firm* — Scully, Scott, Murphy & Presser, P.C.; Teddi Maranzano

(57) ABSTRACT

A method, system, and computer product for transmitting data generated from an airplane includes collecting a plurality of flight data generated from the airplane, analyzing the plurality of flight data, generating a feedback signal based on an analyzed result on the plurality of flight data, selecting a first group of flight data from the plurality of flight data based on the feedback signal, changing a respective data resolution of each of the first group of flight data based on the feedback signal, providing each of the first group of flight data with the changed data resolution to a transmitting device, and transmitting, using the transmitting device, the first group of flight data with the changed data resolution.

20 Claims, 10 Drawing Sheets

(56) References Cited

U.S. PATENT DOCUMENTS

| | | |
|---|---|---|
| 9,965,961 B2 * | 5/2018 | Agrawal .............. G08G 5/0039 |
| 2003/0225492 A1 | 12/2003 | Cope et al. |
| 2009/0012663 A1 | 1/2009 | Mead et al. |
| 2010/0115137 A1 | 5/2010 | Kim et al. |
| 2012/0191273 A1 | 7/2012 | Jacobs et al. |

* cited by examiner

| ID | DATA TYPE |
|---|---|
| 1 TO M | FLIGHT DATA $FD_1$ TO $FD_M$ |
| (M+1) TO N | WEATHER DATA $WD_{M+1}$ TO $WD_N$ |

| ID | APPLIED CRITERIA |
|---|---|
| 1 | CRITERION 1 $CR_1$ |
| 2 | CRITERION 2 $CR_2$ |
| ⋮ | ⋮ |
| N | CRITERION N $CR_N$ |

METHOD FOR PRIORITIZING AND TRANSMITTING DATA GENERATED FROM AN AIRPLANE DURING FLIGHT

FIELD

The present disclosure relates to a system for transmitting data generated from an airplane, and more particularly, to a system for transmitting data generated from an airplane and adaptively changing a data resolution depending on whether the airplane is in an emergency state.

BACKGROUND

In case of emergency situations such as an airplane's crash or distress, data generated from the airplane can be used as a key clue to search passengers and crew members or investigate cause of the accident. In some cases, a black box storing such data may not be found or it may take a while to recover it.

With a modern technology, it is possible to transmit the "data generated from the airplane" (which will be referred to as "flight data") to related parties (e.g., an air control authority, an airline company) which require the flight data, but existing data transmission systems implemented in airplanes require to transmit much non-essential data, thereby resulting in wastes of corresponding bandwidths and storages.

Therefore, there is a need for a system of transmitting data in more cost-effective way, reducing the wastes of bandwidth and storage.

SUMMARY

In an aspect of the present disclosure, a system for transmitting data generated from an airplane is provided. The system includes a memory device, one or more processing devices, and a transmitting device. The one or more processing devices are coupled with the memory device. The one or more processing devices are configured to perform: collecting a plurality of flight data generated from the airplane; analyzing the plurality of flight data; generating a feedback signal based on an analyzed result on the plurality of flight data; selecting a first group of flight data from the plurality of flight data based on the feedback signal; changing a respective data resolution of each of the first group of flight data based on the feedback signal; and providing each of the first group of flight data with the changed data resolution to a transmitting device. The transmitting device is configured to transmit the first group of flight data with the changed data resolution.

In an aspect of the present disclosure, a computer-implemented method for transmitting data generated from an airplane is provided. The method includes collecting a plurality of flight data generated from the airplane, analyzing the plurality of flight data, generating a feedback signal based on an analyzed result on the plurality of flight data, selecting a first group of flight data from the plurality of flight data based on the feedback signal, changing a respective data resolution of each of the first group of flight data based on the feedback signal, providing each of the first group of flight data with the changed data resolution to a transmitting device, and transmitting, using the transmitting device, the first group of flight data with the changed data resolution.

In an aspect of the present disclosure, a computer program product stored in a computer readable storage medium having computer readable program instructions is provided. The computer readable program instructions are read and executed by at least one processor for performing a method for transmitting data generated from an airplane. The method includes collecting a plurality of flight data generated from the airplane, analyzing the plurality of flight data, generating a feedback signal based on an analyzed result on the plurality of flight data, selecting a first group of flight data from the plurality of flight data based on the feedback signal, changing a respective data resolution of each of the first group of flight data based on the feedback signal, providing each of the first group of flight data with the changed data resolution to a transmitting device, and transmitting, using the transmitting device, the first group of flight data with the changed data resolution.

DETAILED DESCRIPTION OF THE EMBODIMENTS

Embodiments of the present disclosure will now be described in detail on the basis of the drawings. However, the following embodiments do not restrict the invention claimed in the claims. Moreover, all combinations of features described in the embodiments are not necessarily mandatory for the architecture of the present disclosure. Like numbers are assigned to like elements throughout the description of the embodiments of the present disclosure.

According to exemplary embodiments of the present disclosure, a method, system, and computer product for transmitting flight data generated from an airplane to related parties such as an air-control authority, an airline company, etc. A system for transmitting flight data according to the present disclosure is shortly referred to as a "data transmission system".

Figure 1:
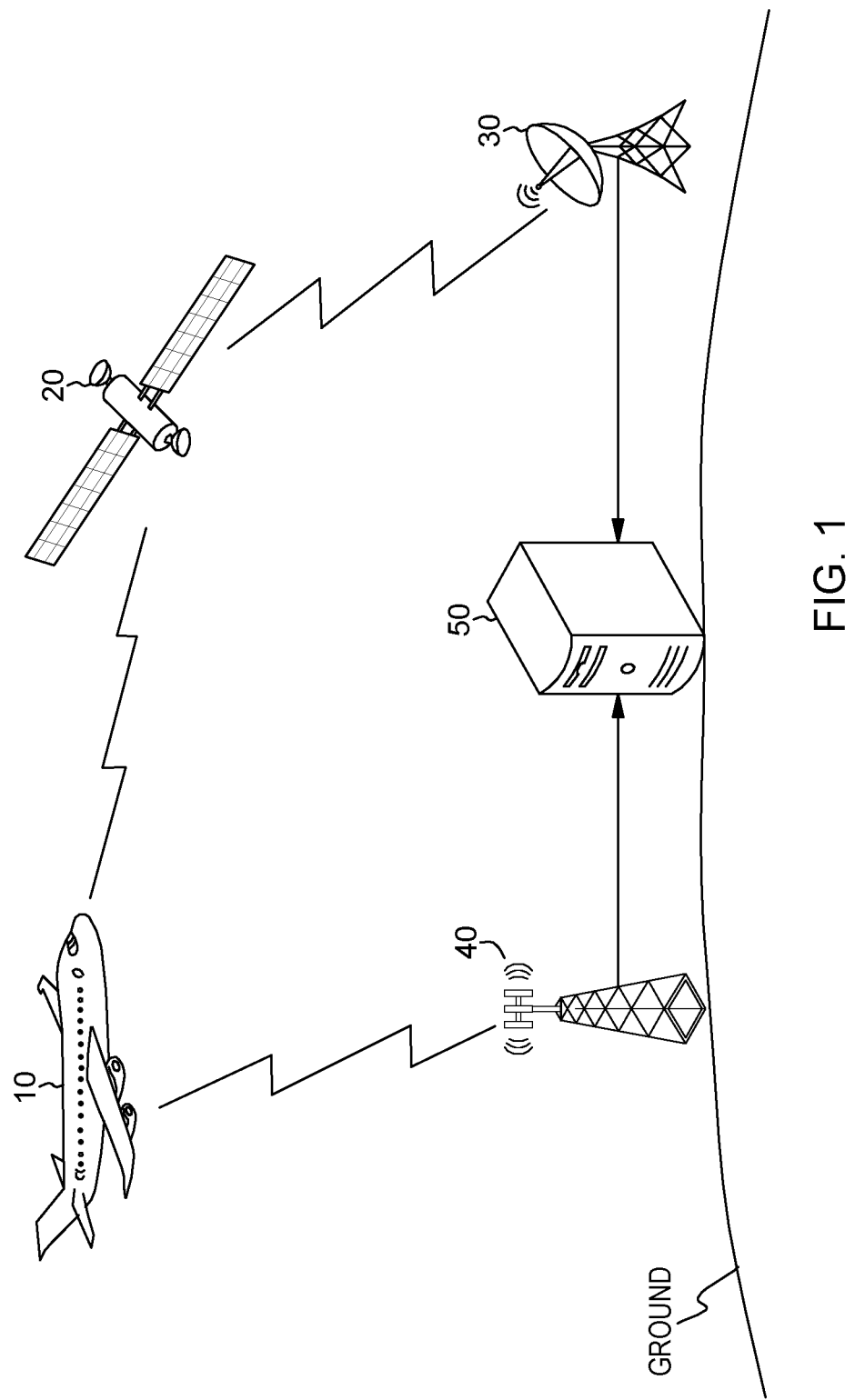
FIG. 1 depicts an example of an airplane communication network according to an exemplary embodiment of the present disclosure.

FIG. 1 depicts an example of an airplane communication network according to an exemplary embodiment of the present disclosure.

Referring to FIG. 1, an airplane 10 may transmit flight data generated therefrom to a storage device 50 (for example, accessed or located by or at the related parties such as an air-control authority, an airline company, etc.) via any available communication channels implemented using, e.g., a satellite 20, a ground station 30, a base station 40, etc. Examples of the available communication channels include radio communication channels (e.g., VHF), satellite communication channels (e.g., SATCOM), internet communication channels (e.g., WiFi), cellular communication channels, etc. However, an available bandwidth allowed for the airplane communications during flight may be limited and costly. Thus, if data generated from the airplane is transmitted without one or more specific processes to reduce a size (e.g., a bandwidth or an amount) of the data to be transmitted, it may result in wasted bandwidths or storages. Therefore, the present disclosure proposes a flight data transmission system or method where flight data to be transmitted are selected from originally flight data and/or a data resolution(s) (e.g., quality) of the selected flight data to be transmitted are adaptively controlled depending on an emergency situation associated with the airplane.

Figure 2:
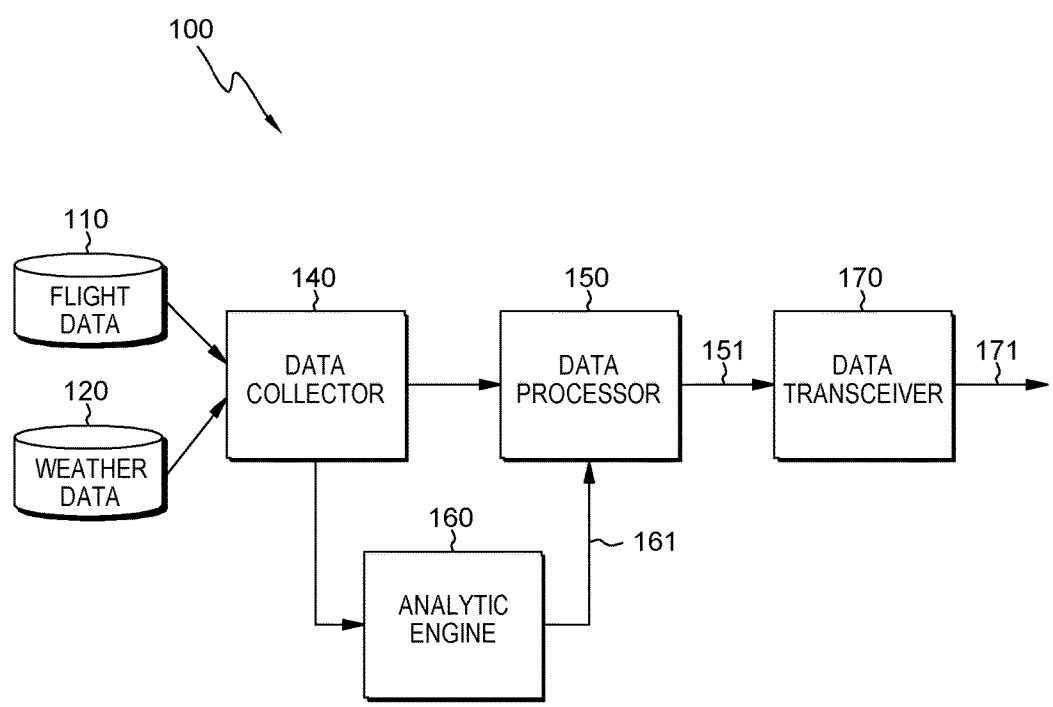
FIG. 2 depicts an example block diagram of a data transmission system embodied in the airplane, according to an exemplary embodiment of the present disclosure.

FIG. 2 depicts an example block diagram of a data transmission system 100 embodied in the airplane 10, according to an exemplary embodiment of the present disclosure.

Referring to FIG. 2, the data transmission system 100 may include a data collector 140, a data processor 150, an analytic engine 160, and a data transceiver 170. The data collector 140 may collect a variety of data such as, but are not limited to: flight data 110 and weather data 120. In one example, the flight data 110 may be generated by an airplane 10 or associated with status of main equipments or instruments (e.g., engine) that constitute the airplane 10. The weather data 120 may be provided and updated from an external source (not shown). The flight data 110 may include, but are not limited to: an air-speed, an altitude, an engine's revolutions per minute (RPM), global positioning system (GPS) coordinates, amperes being drawn from a hydraulic motor, an oil pressure, a rudder position, a fuel pressure, a fuel consumption, a status of an intercom system, a status of a cockpit, etc. The weather data 120 may include, but are not limited to: weather forecast information such as special weather alerts (e.g., weather warning or advisory, etc.), a wind speed, and an amount of rainfall, etc. The weather forecast information may be associated with a current location of the airplane. Next, the data collector 140 may provide the collected flight data and/or the weather data 110 and 120 to the analytic engine 160. The data collector 140 may be embodied with a buffer or memory device.

The analytic engine 160 may analyze on the flight and/or weather data 110 and 120, and provide a feedback signal 161 to the data processor 150 when an emergency event is detected based on an analyzed result on the flight and/or weather data 110 and 120. The feedback signal 161 may include instructions (or information) applied to the data processor 150, such as: (1) "a list of flight data to be transmitted" (shortly, "TDL") to the storage device 50 (FIG. 1); and/or (2) data resolution information (or data quality information) to be applied to each data included in the TDL or data resolution information to be applied to all data included in the TDL. In the context of the present disclosure, the data resolution (or data quality) may be associated with a sampling interval of data or precision of data. In one example, the sampling interval may be related to how often (e.g., once a second, 600 times a second, etc.) data is transmitted. In a further example, the precision of data may be related to the number of data bits used to express a value (e.g., the number of pixels per frame or a color depth per pixel in case of data being an image, the number of bits per audio sample, e.g., in case of data being a voice).

In some embodiments, the analytic engine 160 may monitor a respective value or state for at least one of the flight data 110 and the weather data 120 to see if there occurs abnormality on the data value or state thereof. If there occurs abnormality, the analytic engine 160 generates the feedback signal 161 with the instructions (or information) to the data processor 150. However, if there occurs no abnormality, the analytic engine 160 does not generate the feedback signal 161; in some aspects, the analytic engine 160 may generate a feedback signal including a normal state indicator. The abnormality may include, but is not limited to: a sudden change in flight data, a data value or state which is greater or lower than a predetermined threshold, an issue of special weather alert, triggering of an emergency bell, no response from a cockpit for a predetermined time, etc.

Figure 3:
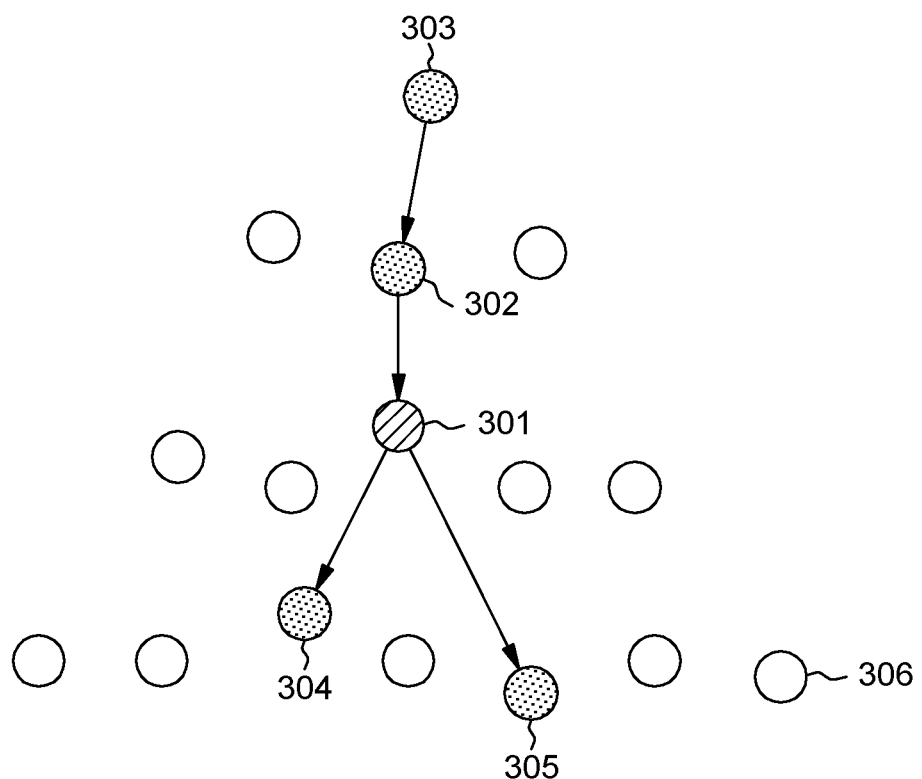
FIG. 3 depicts an example of a hierarchical network structure of flight data according to an exemplary embodiment of the present disclosure.

In some embodiments, if there occurs abnormality on a certain data, the data transmission system 100 may identify one or more other data associated with the corresponding certain data with abnormality. It is understood that the "one or more data associated with the corresponding data with abnormality" may include one or more higher level data which has affected the abnormality of the corresponding data or one or more lower level data which will be affected by the value or state of the corresponding data. FIG. 3 depicts an example of a hierarchical network structure of flight data according to an exemplary embodiment of the present disclosure. As seen in FIG. 3, assuming that abnormality is detected in a certain data 301, data associated with the data 301 with abnormality may be data 302 to 305. It can be understood that the data 302 to 305 are more closely associated to the data 301 or with each other, than other data (e.g., 306). Thus, the more important the data 301 becomes, the more important each of the data 302 to 305 becomes. By way of example, if an engine is consuming far more fuel (e.g., greater than a predetermined threshold) than in a typical takeoff, then the fuel consumption data may be managed as an interesting data (e.g., 301) by the system 100. Thus, data associated with airplane components or parts that cause such abnormal fuel consumption and/or data affected by the fuel consumption may be managed as data (e.g., 302 to 305) that are associated with the fuel consumption data (e.g., 301). In some aspects, the data (e.g., 301 or the fuel consumption data) with abnormality and the data (e.g., 302 to 305) associated with the data (e.g., 301) may be regarded as data with higher priority to be transmitted than other data (e.g., 306). In a further example, the data 303 (at a root position) in the hierarchical structure of FIG. 3 may be understood as being more important than other data 302, 304, and 305 since the data 303 is associated with a root cause to initially generate the abnormality. An algorithm for finding a root cause or data associated with the root cause is disclosed in a reference entitled "An efficient algorithm for root cause analysis", K. Bhattacharya et al. (http://www.tenet.res.in/Publications/Research/RCAPaper-NCC-2005.pdf).

In the present disclosure, whether a certain data has abnormality may be detected by comparing a value or state of the data with a corresponding criterion.

Figures 4A, 4B, 4C:
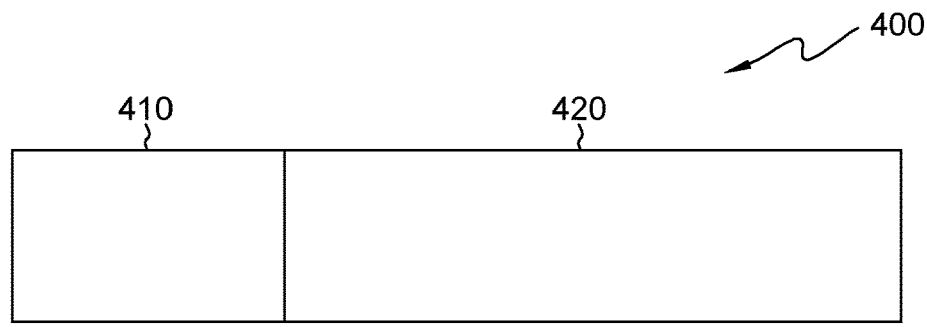
FIG. 4A depicts an example structure of each data within a data set including flight data and weather data according to an exemplary embodiment of the present disclosure.
FIG. 4B depicts an example mapping relationship between each data within a data set including flight data and weather data and a respective identification (ID) of each of the data points within the data set according to an exemplary embodiment of the present disclosure.
FIG. 4C depicts an example mapping relationship between a respective ID of each of the data points within the data set and a corresponding criterion applied to the ID according to an exemplary embodiment of the present disclosure.

FIG. 4A depicts an example structure of each data 400 included in the flight data 110 and the weather data 120 according to an exemplary embodiment of the present disclosure. FIG. 4B depicts an example mapping relationship between each data 400 included in the flight data 110 and the weather data 120 and a respective ID of the each data 400 according to an exemplary embodiment of the present disclosure. FIG. 4C depicts an example mapping relationship between a respective ID of the each data 400 and a corresponding criterion $CR_1$ to $CR_n$ applied to the ID according to an exemplary embodiment of the present disclosure.

As shown in FIG. 4A, each data 400 included in the flight data 110 and the weather data 120 may include an identification (ID) 410 corresponding to the data 400 and a corresponding value or state 420 thereof, and may be provided to the analytic engine 160 to be analyzed. For example, as depicted in FIG. 4B, the ID 410 (FIG. 4A) of each data 400 may range from 1 to N (N is an integer greater than 0). The flight data 110 may have one of the IDs ranging from 1 to M (M is an integer greater than 0), and the weather data 120 may have one of the IDs ranging from (M+1) to N. Hereinafter, the flight data 110 with the IDs of 1 to M may be identified by reference characters $FD_1$ to $FD_M$, respectively. As with the flight data $FD_1$ to $FD_M$, the weather data 120 with the IDs of (M+1) to N may be identified by reference characters $WD_{M+1}$ to $WD_N$, respectively.

FIGS. 5A to 5D depict flow charts illustrating a method for transmitting flight data in an adaptive manner depending on whether an airplane is in an emergency state, according to an exemplary embodiment of the present disclosure.

Figure 5A:
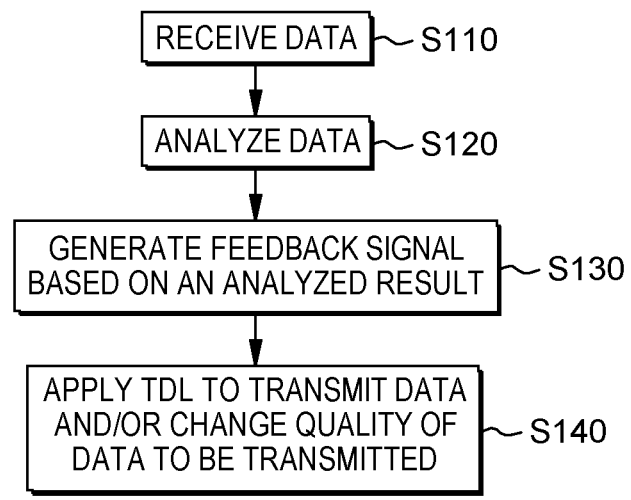
FIGS. 5A to 5D depict flow charts illustrating a method for transmitting flight data in an adaptive manner depending on whether an airplane is in an emergency state, according to an exemplary embodiment of the present disclosure.
Figure 5B:
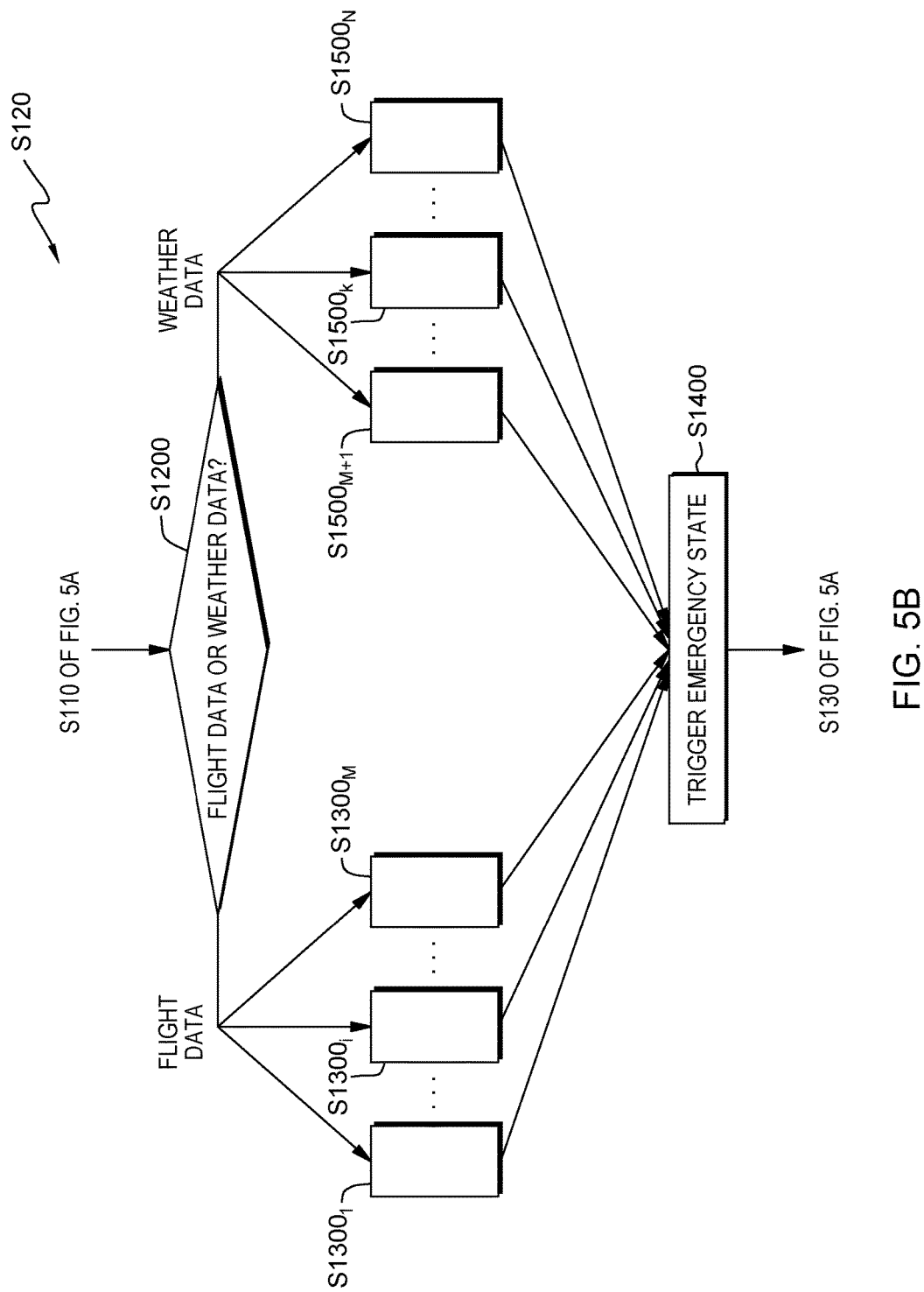

Referring to FIG. 5A, the analytic engine 160 may receive the flight data $FD_1$ to $FD_M$ and/or the weather data $WD_{M+1}$ to $WD_N$ (S110), and perform analyzing on each of the received data $FD_1$ to $FD_M$ and/or $WD_{M+1}$ to $WD_N$ (S120). In some aspects, the step S120 may include detailed sub-steps S1200, $S1300_1$ to $S1300_M$, S1400, and/or $S1500_{M+1}$ to $S1500_N$, as depicted in FIG. 5B. Referring to FIG. 5B, at S1200, the analytic engine 160 may determine whether each of the received data $FD_1$ to $FD_M$ and/or $WD_{M+1}$ to $WD_N$ is one of the flight data $FD_1$ to $FD_M$ or one of the weather data $WD_{M+1}$ to $WD_N$ based on the ID 410 included in each data 400. In one example, an ID of a certain data falls in the range of 1 to M, the analytic engine 160 may determine the data as one of the flight data $FD_1$ to $FD_M$; further, if the ID of the certain data falls in the range of M+1 to N, the analytic engine 160 may determine the data as one of the weather data $WD_{M+1}$ to $WD_N$. However, the present disclosure is not limited thereto; for example, the flight data 110 and the weather data 120 may be provided to the analytic engine 160 through different paths (as seen in FIG. 5B), so that the system 100 may detect whether the received data is flight data or weather data based on a path along which the data is received.

Figure 5C:
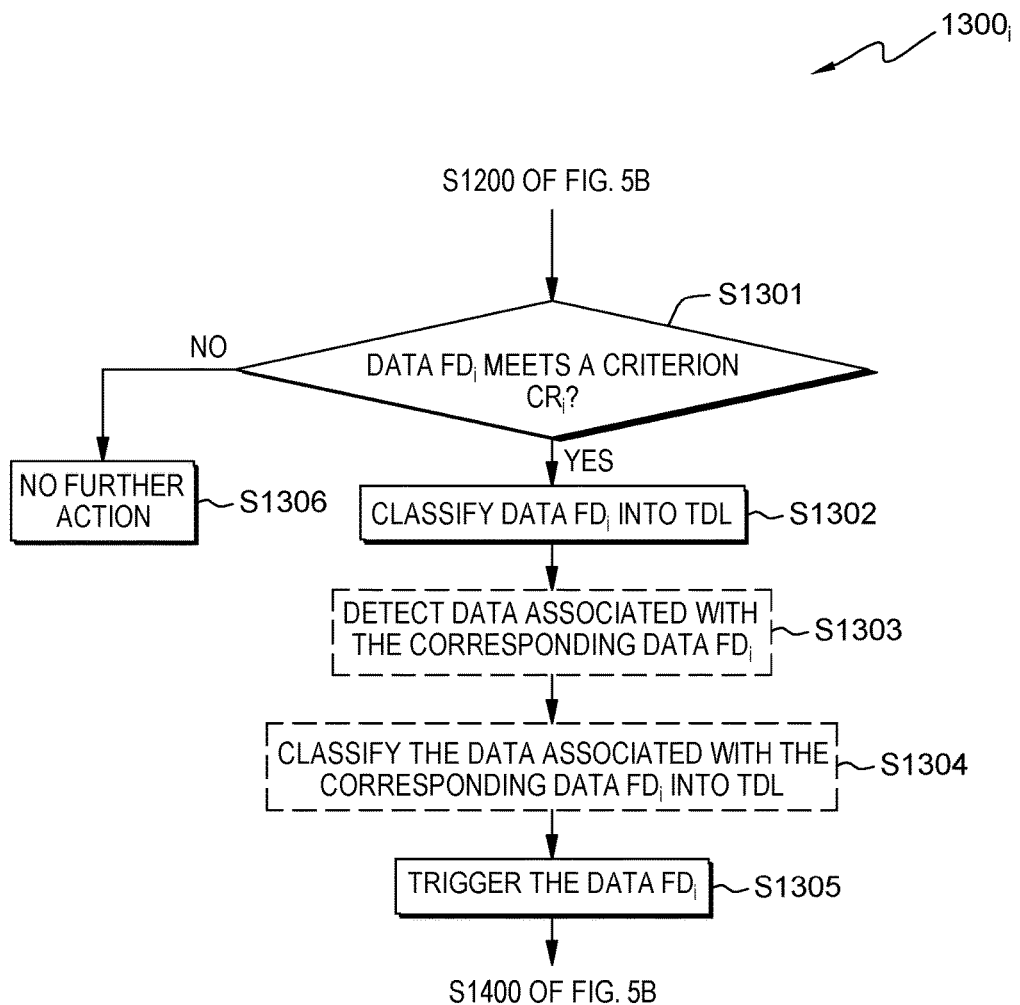

In case of incoming data being determined into one of the flight data $FD_1$ to $FD_M$ at step S1200, the analytic engine 160 may perform steps $S1300_1$ to $S1300_M$ that have substantially the detailed same sub-steps one as another except different criteria are used to determine abnormalities for the flight data $FD_1$ to $FD_M$, and thus duplicate illustrations and descriptions of the other steps (e.g., $S1300_1$ to $S1300_{i-1}$ and $S1300_{i+1}$ to $S1300_M$) than the step $S1300_i$ will be omitted for the sake of simplicity. FIG. 5C depicts detailed sub-steps of the step $S1300_i$. Here, "i" is an integer such that $1 \leq i \leq M$.

Figure 5D:
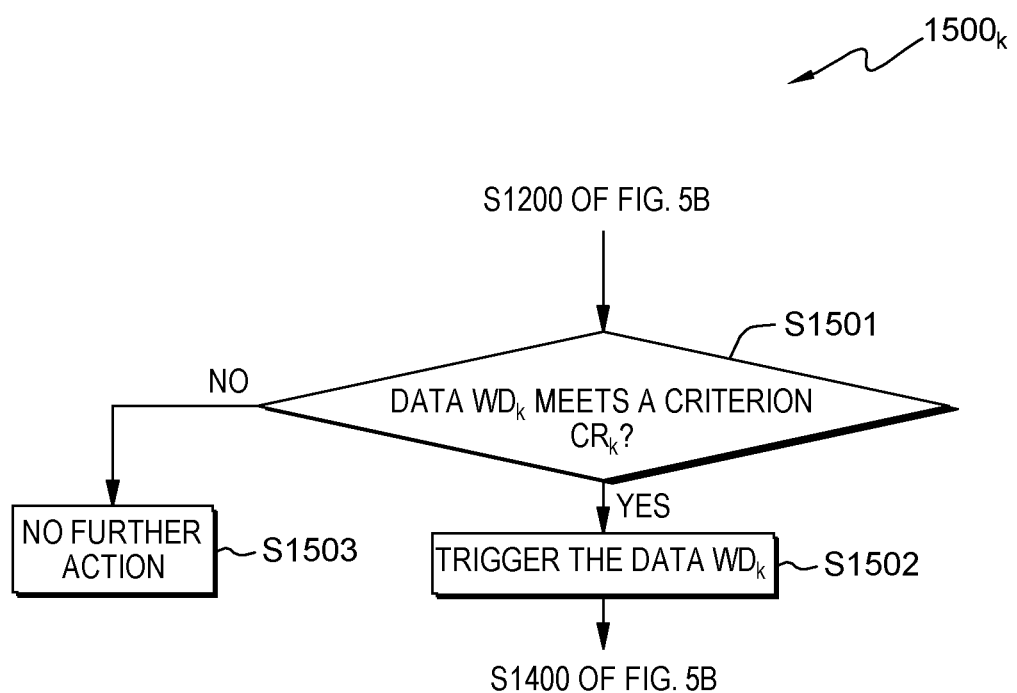

In case of incoming data being determined into one of the weather data $WD_{M+1}$ to $WD_N$ at step S1200, the analytic engine 160 may perform steps $S1500_{M+1}$ to $S1500_N$ that have substantially the detailed same sub-steps one as another except different criteria are used to determine abnormalities for the weather data $WD_{M+1}$ to $WD_N$, and thus duplicate illustrations and descriptions of the other steps (e.g., $S1500_{M+1}$ to $S1500_{k-1}$ and $S1500_{k+1}$ to $S1500_N$) than the step $S1500_k$ will be omitted for the sake of simplicity. FIG. 5D depicts detailed sub-steps of the step $S1500_k$. Here, "k" is an integer such that $M+1 \leq k \leq N$.

Referring to FIG. 5C, in order to determine whether a value or state of flight data (e.g., $FD_i$) is abnormal, the analytic engine 160 may compare a value or state of the flight data (e.g., $FD_i$) with a predetermined criterion (e.g., $CR_i$) (S1301). In some aspects, the analytic engine 160 may use different criteria for flight data $FD_1$ to $FD_M$ (as depicted in FIG. 4C). In one example, if the flight data $FD_i$ (with an ID=i) is received, a value or state of the data $FD_i$ may be compared with a criterion $CR_i$ (S1301). If the value or state of the data $FD_i$ meets the criterion $CR_i$ (YES), the analytic engine 160 may classify the data $FD_i$ into the TDL (or update the TDL to further include the data $FD_i$) (S1302); in some aspects, the analytic engine 160 may further detect data (e.g., root cause) associated the data $FD_i$ among the remained data (e.g., $FD_1$ to $FD_{i-1}$ and $FD_{i+1}$ to $FD_M$) (S1303), classify the detected data associated the data $FD_i$ into the TDL (S1304), and trigger the data $FD_i$ (S1305). At the step S1301, if the value or state of the flight data $FD_i$ does not meet the criterion $CR_i$ (NO), the analytic engine 160 may perform no further action (S1306) (or discard the data $FD_i$). In other aspects, the steps S1303 and S1304 may be omitted; in this case, the TDL might not include the data associated with the data $FD_i$. As described above, similar steps applied for the flight data $FD_i$ may be conducted for each of the other flight data (e.g., $FD_1$ to $FD_{i-1}$ and $FD_{i+1}$ to $FD_M$); in this case, different criteria may be applied at the step S1301 for each of the data $FD_1$ to $FD_M$.

Referring still to FIG. 5C, as described above, the flight data $FD_i$ to $FD_M$ may include, but are not limited to: an air-speed, an altitude, an engine RPM, GPS coordinates, amperes being drawn from a hydraulic motor, an oil pressure, a rudder position, a fuel pressure, a fuel consumption, a status of an intercom system, a status of a cockpit, etc. In some embodiments, some of the criteria $CR_1$ to $CR_M$ corresponding to the flight data $FD_i$ to $FD_M$, respectively may be whether a value (or state) of corresponding data exceeds a respective predetermined threshold; in one example, whether a value of the fuel pressure, the oil pressure, etc. is greater than (or lower than) a predetermined threshold. In some embodiments, some of the criteria $CR_1$ to $CR_M$ may be whether a difference between a current value of corresponding data and a previous value of the corresponding data is larger than (or smaller than) a predetermined threshold; in one example, whether a difference of a current value of the air-speed, the altitude, the engine RPM, the fuel consumption, or etc. and a previous value thereof is larger than (or smaller than) a predetermined threshold. In some embodiments, some of the criteria $CR_1$ to $CR_M$ may be whether a state of corresponding data is abnormal (e.g., emergency status); for example, whether an intercom system is at a normal state or at an abnormal state such as no response being received for a predetermined period from a cockpit. In some embodiments, some of the criteria $CR_1$ to $CR_M$ may be whether a value of corresponding data tracks a value expected according to an analytic model that has been preloaded to the system 100; in one example, an analytic model for an engine (e.g., Rolls-Royce Trent 1000) can be pre-loaded to the system 100, and a current value of the fuel consumption during the airplane's taking-off may be compared against the pre-loaded model for the engine, if the engine is consuming far more fuel than in a typical takeoff jet engine (e.g., a value expected according the pre-loaded model for the engine), the corresponding data can be determined to meet a corresponding criterion.

Referring to FIG. 5D, in order to determine whether a value or state of weather data (e.g., $WD_k$) is abnormal, the analytic engine 160 may compare a value or state of the weather data (e.g., $WD_k$) with a predetermined criterion (e.g., $CR_k$). In some aspects, the analytic engine 160 may use different criteria for weather data $WD_{M+1}$ to $WD_N$ (as depicted in FIG. 4C). In one example, if the weather data $WD_k$ (with an ID=k) is received, a value or state of the weather data $WD_k$ may be compared with a criterion $CR_k$ (S1501). If the value or state of the weather data $WD_k$ meets the corresponding criterion $CR_k$ (YES), the analytic engine 160 may trigger the weather data $WD_k$ (S1502). If the value or state of the weather data $WD_k$ does not meet the criterion $CR_k$ (NO), the analytic engine 160 may perform no further action (S1503) (or discard the weather data $WD_k$). As described above, similar steps applied for the weather data $WD_k$ may be conducted for each of other weather data $WD_{M+1}$ to $WD_{k-1}$ and $WD_{k+1}$ to $WD_N$.

Referring back to FIG. 5B, at step S1400, the analytic engine 160 may trigger an emergency state responsive to at least one of the data $FD_1$ to $FD_M$ and $WD_{M+1}$ to $WD_N$ being triggered as results of the steps S1305 (FIG. 5C) and S1502 (FIG. 5D).

Figure 6:
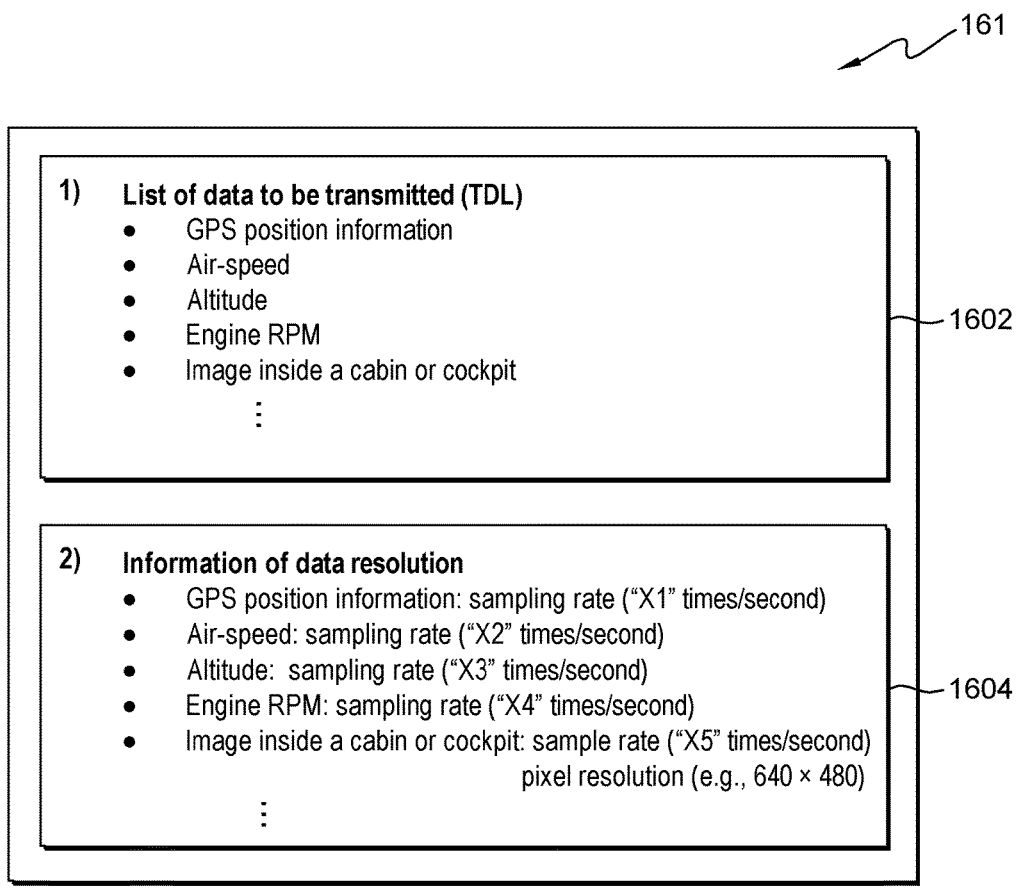
FIG. 6 depicts an example content of the feedback signal according to an exemplary embodiment of the present disclosure.

Referring back again to FIG. 5A, at step S130, the analytic engine 160 may generate a feedback signal 161 responsive to triggering of the emergency state, and at step S140, the data processor 150 may use information (e.g., TDL or data resolution information) included in the feedback signal 161 the TDL to select flight data to be transmitted to the storage device 50 on the ground and/or to change data resolution (or data quality) of the flight data to be transmitted. FIG. 6 depicts an example content of the feedback signal 161 according to an exemplary embodiment of the present disclosure. As depicted, the feedback signal 161 may include information of the TDL 1602 and data resolution information to be applied to data within the TDL 1602. By way of only example, the TDL 1602 may include, but are not limited to: a GPS position information, an air-speed, an altitude, an engine RPM, and/or an image inside a cabin or cockpit. Further, by way of only example, the data resolution information 1604 may include, but are not limited to: a respective sampling rate and/or a respective data precision (e.g., pixel resolution) for at least one of the data included in the TDL. As shown in FIG. 6, a respective data resolution can be individually set for each of the data included in the TDL. For example, in the sample rates of the reference number 1604 of FIG. 6, "X1" to "X5" can be set arbitrarily, so as to be the same as each other or different from each other.

In some embodiments, the data transmission system 100 may preset data to be included in the TDL 1602 with "essential data" (in the context of the present disclosure, the term "essential data" are understood as preset data that must be transmitted, regardless of whether the airplane is in an emergency state). For example, the TDL 1602 may be updated to include: data triggered through the steps S1305 (FIG. 5C) and S1502 (FIG. 5D); and/or data associated with the triggered data detected through the step S1303 (FIG. 5C).

Referring back to FIG. 2, the data processor 150 may receive the flight data $FD_1$ to $FD_M$ from the data collector 140 and the feedback signal 161 from the analytic engine 160. Further, responsive to receipt of the feedback signal 161, the data processor 150 may select data to be transmitted from the flight data $FD_1$ to $FD_M$ using the TDL 1602 included in the feedback signal 161 and/or control (or change) a respective resolution of the data corresponding to the TDL according to the data resolution information 1604 included in the feedback signal 161. The data processor 150 may output the data 151 selected using the TDL 1602 to the data transceiver 170, while changing the respective resolution of the selected data according to the data resolution information 1604.

Although not shown in figures, in some embodiments, when the airplane is in a normal state (e.g., when no triggered data is detected at the step S1400 (FIG. 5B)), the data processor 150 may output none of the flight data $FD_1$ to $FD_M$, or only the essential data with a relatively low data resolution(s) (which is predetermined), compared to the data resolution(s) included in the feedback signal 161 (FIG. 6). Thus, according to an exemplary embodiment of the present disclosure, a size (or a bandwidth) of flight data transmitted when the airplane is in an emergency state is lower than a size (or a bandwidth) of flight data transmitted when the airplane is in a normal state.

Referring back to FIGS. 1 and 2, the data transceiver 170 may receive the selected data 151 whose resolution(s) is (or are) controlled according to the data resolution information 1604, convert the data 151 into a carrier signal 171 including the data 151, and transmit the signal 171 to the storage device 50 (FIG. 1).

Figure 7:
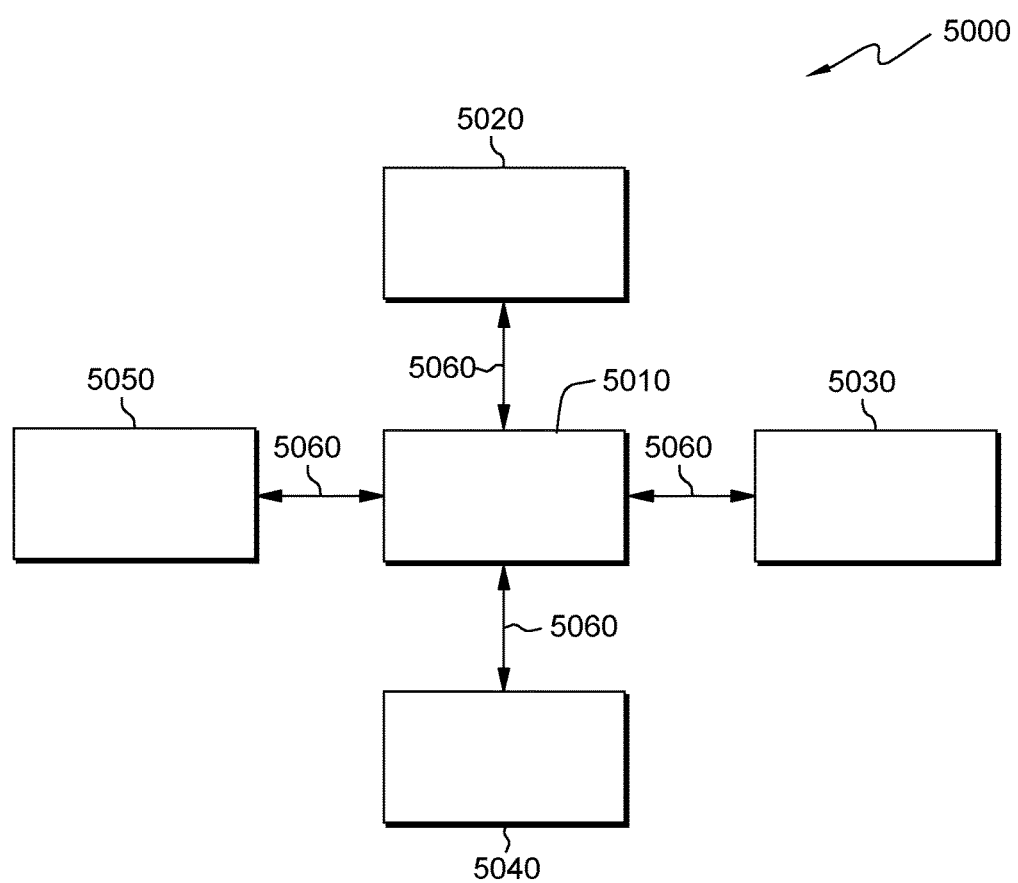
FIG. 7 is a block diagram of a computing system according to an exemplary embodiment of the present disclosure.

FIG. 7 is a block diagram of a computing system 5000 according to an exemplary embodiment of the present disclosure.

Referring to FIG. 7, the computing system 5000 may be used as a platform for performing (or controlling) the functions or operations described hereinabove with respect to the system 100 of FIG. 2, and/or method of FIGS. 5A to 5D.

In addition, the computing system 5000 may be implemented with an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring to FIG. 7, the computing system 5000 may include a processor 5010, I/O devices 5020, a memory system 5030, a display device 5040, and a network adaptor 5050.

The processor 5010 may drive the I/O devices 5020, the memory system 5030, the display device 5040, and the network adaptor 5050 through a bus 5060.

The computing system 5000 may include a program module (not shown) for performing (or controlling) the functions or operations described hereinabove with respect to the system 100 of FIG. 2, and/or method of FIGS. 5A to 5D according to exemplary embodiments. For example, the program module may include routines, programs, objects, components, logic, data structures, or the like, for performing particular tasks or implement particular abstract data types. The processor (e.g., 5010) of the computing system 5000 may execute instructions written in the program module to perform (or control) the functions or operations described hereinabove with respect to the system 100 of FIG. 2, and/or method of FIGS. 5A to 5D. The program module may be programmed into the integrated circuits of the processor (e.g., 5010). In an exemplary embodiment, the program module may be stored in the memory system (e.g., 5030) or in a remote computer system storage media.

The computing system 5000 may include a variety of computing system readable media. Such media may be any available media that is accessible by the computer system (e.g., 5000), and it may include both volatile and non-volatile media, removable and non-removable media.

The memory system (e.g., 5030) can include computer system readable media in the form of volatile memory, such as random access memory (RAM) and/or cache memory or others. The computer system (e.g., 5000) may further include other removable/non-removable, volatile/non-volatile computer system storage media.

The computer system (e.g., 5000) can communicate with one or more devices using the network adapter (e.g., 5050). The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A system for transmitting data generated from an airplane, comprising:
   a memory for storing instructions;
   one or more hardware processors coupled with the memory, the hardware processor receiving said instructions from said memory to configure the one or more hardware processors to perform a method comprising:
      collecting, under control of a first hardware processor, a plurality of flight data generated from a respective plurality of devices of the airplane;
      analyzing, using a second hardware processor, the plurality of flight data;
      generating at the second hardware processor a feedback signal based on an analyzed result on the plurality of flight data, said feedback signal for controlling the first hardware processor to select a first group of flight data from the plurality of flight data;
      changing, using the first hardware processor, a respective data resolution of each of the first group of flight data based on the feedback signal, said data resolution associated with a transmission rate for the first group of flight data; and
   a transceiver configured to receive each of the first group of flight data with the changed data resolution and to transmit the first group of flight data at said associated transmission rate over a communications channel for receipt at a data storage device.

2. The system of claim 1, wherein a size of the first group flight data with the changed resolution is a size of the plurality of flight data generated from the airplane.

3. The system of claim 1, wherein to analyze the plurality of flight data, the one or more hardware processors are further configured to perform:
   comparing each of the plurality of flight data with a corresponding one of a plurality of criteria; and
   determining one or more flight data of the plurality of flight data as abnormal flight data, responsive to the one or more flight data meeting respective predetermined criteria of the plurality of criteria.

4. The system of claim 3, wherein a first one of the plurality of criteria is different from a second one of the plurality of criteria.

5. The system of claim 4, wherein the plurality of criteria comprises: at least one of
   whether a value of a third one of the plurality of flight data is greater or lower than a first predetermined threshold;
   whether a difference between a current value of a fourth one of the plurality of flight data and a previous value of the fourth one is greater than a second predetermined threshold.

6. The system of claim 3, wherein the one or more processing devices are further configured to perform generating the feedback signal when a number of the abnormal flight data is equal to or greater than one.

7. The system of claim 1, wherein the one or more processing devices are further configured to perform:
   collecting a plurality of weather data; and
   analyzing the plurality of weather data and generating the feedback signal further based on an analyzed result on the plurality of weather data.

8. The system of claim 7, wherein the weather data comprises: at least one of a weather alert, a wind speed, and an amount of rainfall associated with a current location of the airplane.

9. The system of claim 1, wherein the feedback signal comprises: at least one of
   a list of flight data to be transmitted (TDL), the hardware processor selecting the first group of flight data using the TDL; and
   information including a respective sampling rate to be applied for transmitting respective data of the selected first group of flight data.

10. The system of claim 9, wherein the one or more hardware processors are further configured to perform:
   prior to generating the feedback signal,
   providing a second group of flight data selected from the plurality of flight data with a predetermined data resolution to the transceiver, the predetermined data resolution associated with a transmission rate for the second group of flight data, and wherein the transceiver is configured to further transmit the second group of flight data at the transmission rate for the second group of flight data, wherein the transmission rate associated with the second group of flight data is lower than the transmission rate associated with the first group of flight data.

11. A computer-implemented method for transmitting data generated from an airplane, comprising:
   collecting under control of a first hardware processor, a plurality of flight data generated from a respective plurality of devices of the airplane;
   analyzing, using a second hardware processor, the plurality of flight data;
   generating at the second hardware processor a feedback signal based on an analyzed result on the plurality of flight data, said feedback signal for controlling the first hardware processor to select a first group of flight data from the plurality of flight data;
   changing, using the first hardware processor, a respective data resolution of each of the first group of flight data based on the feedback signal, said data resolution associated with a transmission rate for the first group of flight data;
   providing each of the first group of flight data with the changed data resolution to a transceiver;
   transmitting, using the transceiver, the first group of flight data at said associated transmission rate over a communications channel for receipt at a data storage device.

12. The method of claim 11, wherein analyzing the plurality of flight data comprises:
   comparing each of the plurality of flight data with a corresponding one of a plurality of criteria; and
   determining one or more flight data of the plurality of flight data as abnormal flight data, responsive to the one or more flight data meeting respective predetermined criteria of the plurality of criteria.

13. The method of claim 12, wherein a first one of the plurality of criteria is different from a second one of the plurality of criteria.

14. The method of claim 13, wherein the plurality of criteria comprises: at least one of
   whether a value of a third one of the plurality of flight data is greater or lower than a first predetermined threshold;
   whether a difference between a current value of a fourth one of the plurality of flight data and a previous value of the fourth one is greater than a second predetermined threshold.

15. The method of claim 11, wherein the feedback signal comprises: at least one of
   a list of flight data to be transmitted (TDL), the first group of flight data being selected using the TDL; and
   a respective sampling rate to be applied for transmitting respective data of the selected first group of flight data.

16. A computer program product stored in a non-transitory computer-readable storage medium having computer readable program instructions, the computer readable program instructions read and executed by at least one processor for performing a computer-implemented method for transmitting data generated from an airplane, wherein the method comprises:
   collecting, under control of a first hardware processor, a plurality of flight data generated from a respective plurality of devices of the airplane;
   analyzing, using a second hardware processor, the plurality of flight data;
   generating at the second hardware processor a feedback signal based on an analyzed result on the plurality of flight data, said feedback signal for controlling the first hardware processor to select a first group of flight data from the plurality of flight data;
   changing, using the first hardware processor, a respective data resolution of each of the first group of flight data based on the feedback signal, said data resolution associated with a transmission rate for the first group of flight data;
   providing each of the first group of flight data, with the changed data resolution to a transceiver;
   transmitting, using the transceiver, the first group of flight data at said associated transmission rate over a communications channel for receipt at a data storage device.

17. The computer program product of claim 16, wherein analyzing the plurality of flight data comprises:
   comparing each of the plurality of flight data with a corresponding one of a plurality of criteria; and
   determining one or more flight data of the plurality of flight data as abnormal flight data, responsive to the one or more flight data meeting respective predetermined criteria of the plurality of criteria.

18. The computer program product of claim 17, wherein a first one of the plurality of criteria is different from a second one of the plurality of criteria.

19. The computer program product of claim 18, wherein the plurality of criteria comprises: at least one of
   whether a value of a third one of the plurality of flight data is greater or lower than a first predetermined threshold;
   whether a difference between a current value of a fourth one of the plurality of flight data and a previous value of the fourth one is greater than a second predetermined threshold.

20. The computer program product of claim 16, wherein the feedback signal comprises: at least one of
   a list of flight data to be transmitted (TDL), the first group of flight data being selected using the TDL; and
   a respective sampling rate to be applied for transmitting respective data of the selected first group of flight data.

* * * * *